(12) United States Patent
Renner et al.

(10) Patent No.: US 7,835,641 B2
(45) Date of Patent: Nov. 16, 2010

(54) LIGHT EMITTER CONTROLLING

(75) Inventors: Martin Renner, Mettman (DE); Armin Pitzer, Krefeld (DE)

(73) Assignee: Lantiq Deutschland GmbH, Neubiberg (DE)

( * ) Notice: Subject to any disclaimer, the term of this patent is extended or adjusted under 35 U.S.C. 154(b) by 574 days.

(21) Appl. No.: 11/848,248

(22) Filed: Aug. 31, 2007

(65) Prior Publication Data

US 2009/0060494 A1 Mar. 5, 2009

(51) Int. Cl.
*H04B 10/04* (2006.01)
(52) U.S. Cl. .......................... 398/15; 398/197
(58) Field of Classification Search ................... 398/15, 398/195, 197
See application file for complete search history.

(56) References Cited

U.S. PATENT DOCUMENTS

| 5,491,572 | A | 2/1996 | Ohara |
| 6,194,707 | B1 | 2/2001 | Yang |
| 6,650,839 | B1 | 11/2003 | Mallard et al. |
| 6,744,987 | B1 | 6/2004 | Boytim et al. |
| 2005/0213982 | A1* | 9/2005 | Weber .......................... 398/135 |
| 2007/0140689 | A1 | 6/2007 | Haran |
| 2009/0216872 | A1* | 8/2009 | Albig et al. .................. 709/224 |

FOREIGN PATENT DOCUMENTS

| EP | 0437162 A2 | 7/1991 |
| EP | 0437161 B1 | 6/1996 |
| GB | 2323490 A | 9/1998 |
| JP | 2003332982 A | 11/2003 |
| KR | 100243661 B1 | 11/1999 |
| KR | 100258091 B1 | 3/2000 |
| KR | 100259043 B1 | 3/2000 |
| KR | 1020010064429 A | 7/2001 |
| WO | 2006121523 A2 | 11/2006 |

* cited by examiner

*Primary Examiner*—Leslie Pascal
(74) *Attorney, Agent, or Firm*—SpryIP, LLC

(57) ABSTRACT

Embodiments related to light emitter control are described and depicted.

19 Claims, 3 Drawing Sheets

LIGHT EMITTER CONTROLLING

BACKGROUND OF THE INVENTION

Optical networks are widely used for data communication in backbones as well as for access networks. In such systems, detection of faulty operation conditions is of importance in order to avoid breakdowns of the network system or other disadvantages. For example in a PON network (passive optical networks), a point to multipoint network system is established between a common optical line termination device (OLT) and a plurality of optical network termination devices (ONT). As in PON networks communication is essential a broadcast communication where simultaneously transmission of optical signals on the network transmitted by more than one of the ONT devices to the OLT device is not allowed, a faulty operation of one of the ONT devices resulting in a permanently sending of optical power over the PON system totally blocks data communication to the OLT device for the other ONT devices.

DETAILED DESCRIPTION OF THE INVENTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

Figure 1:
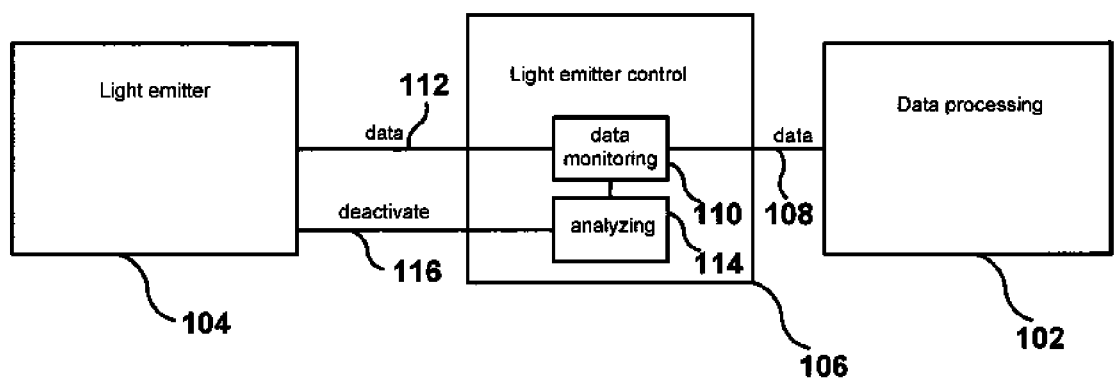
FIG. 1 shows a block diagram according to an embodiment of the present invention.

FIG. 1 shows an optical data transmitter 100 according to an embodiment of the present invention. The Optical data transmitter 100 comprises a data processing circuitry 102, a light emitter 104 and a light emitter control device 106. Light emitter 104 may be a laser or other light source capable to transmit data over optical links. Optical data transmitter 100 may for example be implemented in a PON device such as a ONT device or a OLT device. Optical transmitter may be implemented in routers or other communication devices which may be provided at the interface of an optical communication link and a wired electrical, such as DSL and Ethernet, or a wireless communication link such as WLAN, WiMax, Bluetooth etc. For example, according to embodiments of the present invention, optical transmitter 100 may be implemented in a communication device provided at the interface between a PON network and an electrical communication link of a user, for example an Ethernet communication link, at the interface between a PON network and an electrical DSL communication link or at the interface between a wireless WLAN communication link and an optical network.

Data processing circuitry 102 provides data processing for data to be transmitted over the optical communication link by light emitter 104. Data processing may include but not limited to header processing, scrambling, interleaving, modulating, demodulating and protocol stack processing or other data processing required for the transmission of the data over the optical link. Data processing circuitry may be implemented in hardware, software, firmware or combinations thereof. Data processing circuitry may comprise one or more processors which may be dedicated data processors or multi purpose processors.

Data processing circuitry 102 comprises an output coupled via a data signal line 108 to an input of light emitter control device 106. Data processing circuitry may comprise an input allowing coupling to communication links and networks such as Ethernet and DSL links or networks and receiving of data to be transmitted over an optical link by the light emitter 104 from other devices coupled to the links or networks.

Data processing circuitry 102 provides the electrical data signals of data to be transmitted by the light emitter to the data signal line 108. Light emitter control device 106 comprises a data monitoring circuit 110 coupled to the input of light emitter control device 106 to receive the electrical data signals. According to one embodiment, the data monitoring circuit may be capable to recover a clock signal from the data signal received from data signal line 108. The clock signal may be used in the data monitoring circuit for recovering the data from the data signal. Optionally, according to another embodiment, a separate clock line may be provided in addition to the data signal line 108 as is shown by the dashed line 118 in FIG. 1. In this case, no data recovery may be implemented in the light emitter control device.

Data monitoring circuit 110 comprises a first data output coupled to a data signal line 112 to provide the electrical data signals to an input of the light emitter 104 for transmission over an optical network. Furthermore, data monitoring circuit 110 is coupled to an analyzing circuit 114 to provide information related to the data contained in the electrical data signal to the analyzing circuit 114. According to one embodiment, the information related to the data may be statistical data, for example a density of data bits that have a predetermined logical level, for example a logical level one. Furthermore, according to embodiments, the information provided from monitoring circuit 110 to analyzing circuit 114 may comprise of other information related to the data of the electrical data signal, for example information related to header data contained in the electrical data signal such as a degree of correlation of the header data with valid header data or other information indicating whether the data processing circuit or the data signal line is operating error-free or whether a malfunction or faulty operation occurs in the data processing circuit and/or the data signal line 108.

Analyzing circuit 114 analyzes the information provided by monitoring circuit 110 and decides based on the provided information whether a deactivate signal to deactivate the light emitter 104 is to be generated. As will be described in more detail below, a deactivate signal may for example be generated when the density of bits at logical level 1 increases above a predetermined threshold. The density of bits provides a measure for malfunction or error since for many data communications, the bit density is provided at 50% or very close to 50%, for example by using a scrambler. A significant increase of the density of data bits over 50% provides an indication that an error or malfunction has occurred.

The analyzing circuit 114 comprises an output coupled to a control line 116 to provide the deactivating signal to a control input of the light emitter 104. By providing the deactivating signal to the control input of the light emitter 104, the light emitter 104 is deactivated such that no light power is emitted by light emitter 104 independent of the data signals which are provided by data processing circuitry 102 for optical data transmission. Deactivating the light emitter may include a shut-off or reducing of a bias current and/or modulation current of the light emitter. Other embodiments for deactivating the light emitter may include a shut-down or reduction of power used by the light emitter. It is to be noted that according to embodiments, while the data signal is still be provided to the light emitter, in the deactivated state, no emission of light will occur. In other embodiments, deactivating the light emitter may include a transferring of a data signal to the light emitter containing data bits with a continuous sequence of data bits at logical level zero while the power supply and bias/modulation currents at the light emitter are maintained at operating levels. As the light emitter emits power for data bits with logical level one and emits no power for data bits with logical level zero, the continuous provision of a data signal with bits at logical level 0 results in a deactivating of the light emitter, i.e. no power is transmitted by the light emitter. In this case, the control line 116 may not be provided, as the deactivating of the emission power may be achieved by controlling the light emitter over the data signal line 112. The continuous data signal with bits at logical level 0 may be provided by actuating a switch coupled to the data signal line resulting in a disconnection of the data signal line, thereby maintaining data signal line 112 continuously at zero voltage.

While the monitoring circuit and the analyzing circuit are shown in FIG. 1 to be separated circuit blocks, it is to be noted that in embodiments of the present invention both circuit blocks may be integrated into one circuit or one circuit block. Both circuit blocks may use a common processor to monitor the data and analyze the information as described above. The common processor may be a processor used for other purposes, for example may be a processor provided in the data processing circuitry 102 or may be a processor provided in an optical module of the optical data transmitter 100.

Furthermore, it is to be noted that the light emitter control device 106 may according to one embodiment be implemented at the front end of an optical module while the data processing circuitry is implemented in an electronic module. In this case the data signal line 108 would be routed on a printed circuit board. The arrangement of the light emitter control device 106 allows in addition detecting errors caused by the routing of the data signal line 108 on the printed circuit board.

In other embodiments, the light emitter control device 106 is implemented in the electronic module while the light emitter 104 is implemented in the optical module. In other embodiments, the light emitter 104, the light emitter control device 106 and the data processing circuitry 102 may be implemented on a single module.

Figure 2:
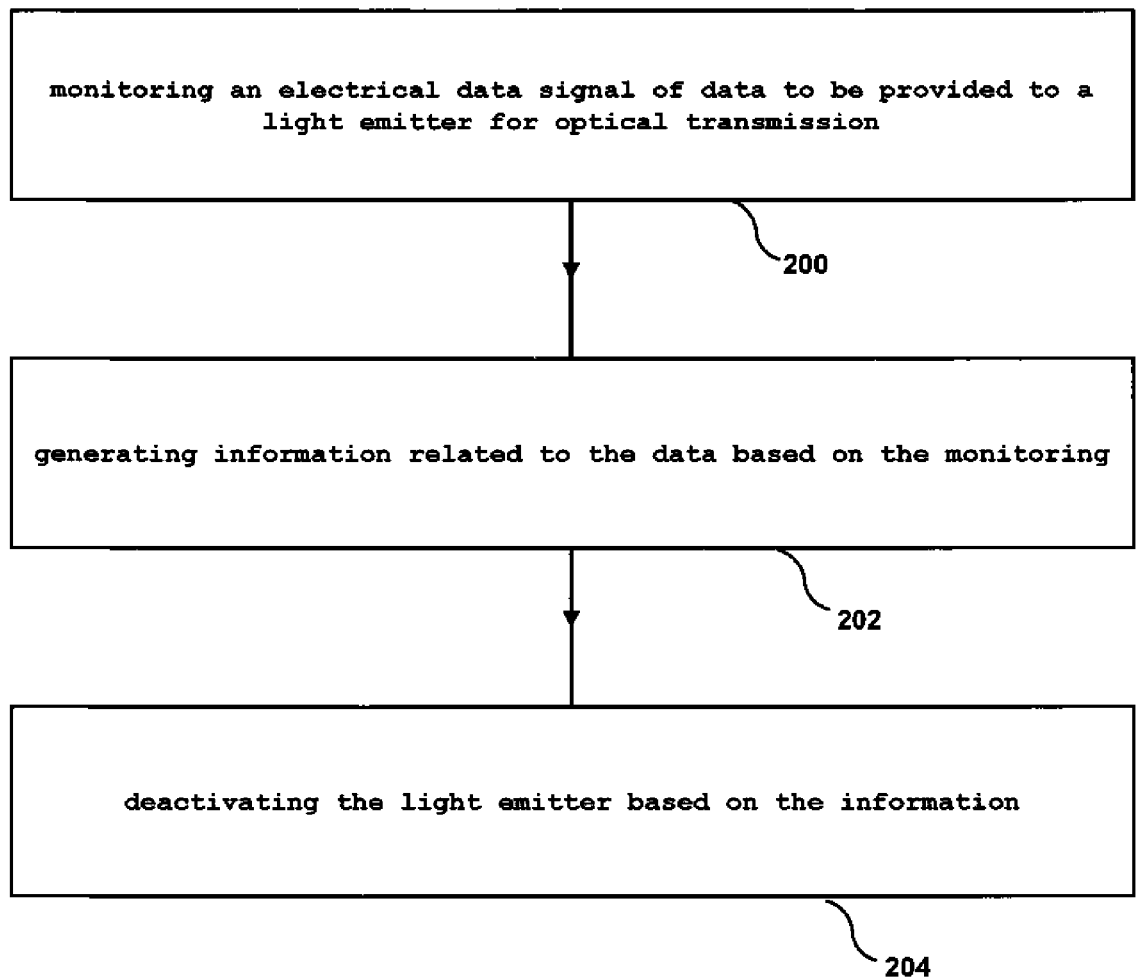
FIG. 2 shows a flow chart diagram according to an embodiment of the present invention.

Referring now to FIG. 2, an exemplary flow diagram according to the present invention will be described. At 200, an electrical data signal of data to be provided to the light emitter for optical transmission is monitored. Then, at 202, information related to the data is generated based on the monitoring. At 204, the light emitter is deactivated based on the information.

As described above, deactivating the laser may include generating of a deactivating signal on a separate control line or using the data signal line to transfer a predetermined deactivating signal to the light emitter. Furthermore, the information may be statistical information related to the data to be transmitted, for example a density of data bits with logical level one. Exemplary embodiments will be described with respect to FIGS. 3 and 4.

Figure 3:
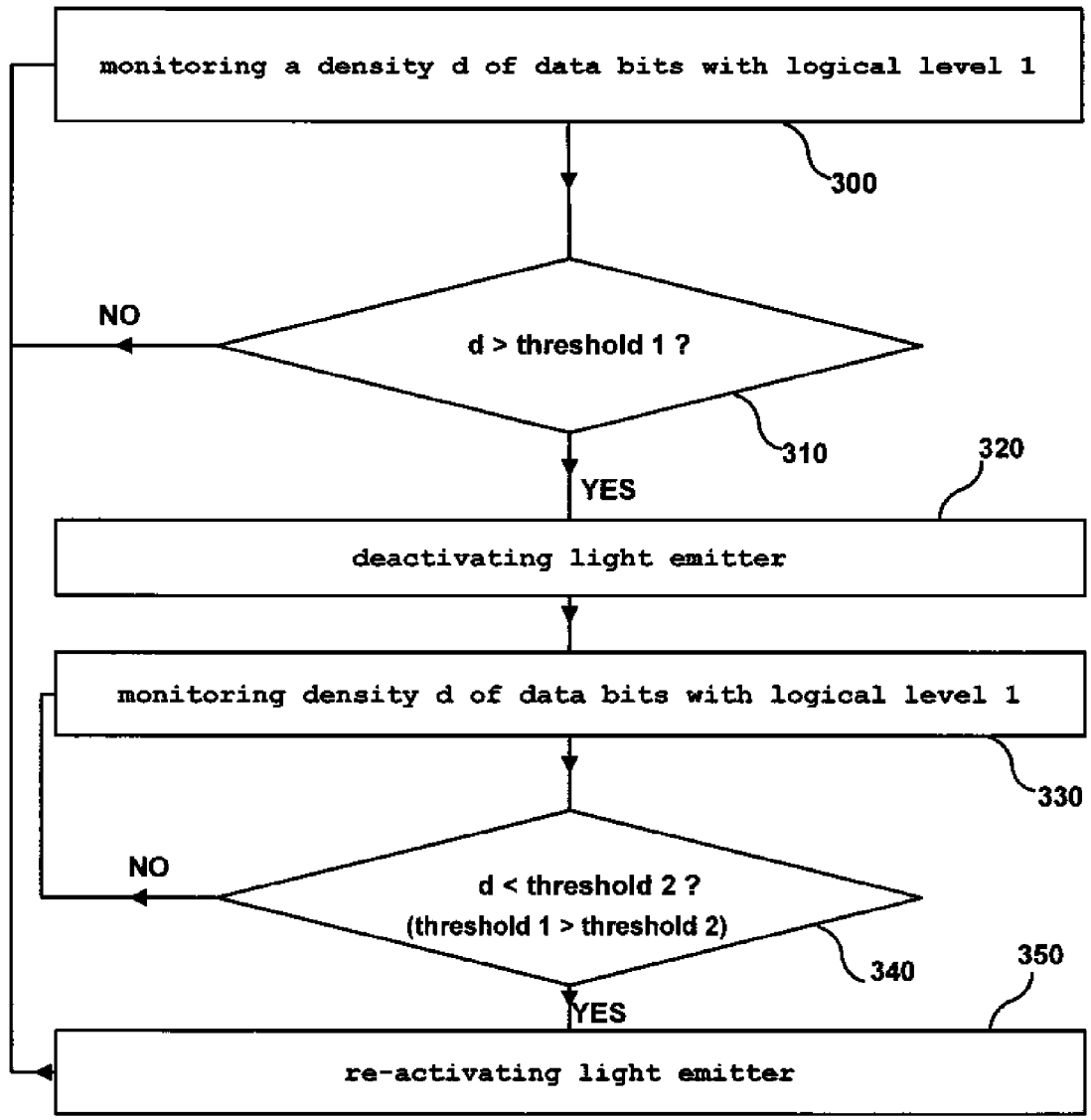
FIG. 3 shows a circuit diagram according to an embodiment of the present invention.

Referring now to FIG. 3, a flow diagram of an exemplary embodiment using a density of data bits within the electrical data signal for generating the deactivating signal is described.

As shown in FIG. 3, at 300 a monitoring of the density d of data bits having logical level 1 contained in a data signal to be transmitted is performed.

At 310, it is determined whether the density of data bits in the data signal exceeds a predetermined first threshold (threshold 1). To give an example, the first threshold may have a value of 60%, however other values higher than 50% may also be encompassed for the first threshold. The first threshold may be provided variable or may be adjusted, for example dependent on the type of data to be transmitted.

In case, the first threshold is not exceeded, the method returns to 310 and continues to monitor the density of data bits as described above.

When the first threshold is exceeded, the light emitter is deactivated at 320. Deactivating may for example include deactivating by reducing or blocking currents of the light emitter or by sending continuously data bits 0 over the data signal line as described above with respect to FIG. 1.

The method steps to 330 where the density d of data bits at logical level 1 is again monitored. Next, the monitored density d of data bits is analyzed at 340 to determine whether the density d of data bits at logical level 1 has dropped below a second threshold (threshold2). In case the density d has not dropped below the second threshold, the method returns to 330 where monitoring of the density d is continued. When it is determined at 340 that the density d has dropped below the second threshold, the method steps to 350 where the light emitter is re-activated to allow the transmission of data over the optical data link. The method then returns to 300 where the density d is continued to be monitored.

It is to be noted that in the above method, the second threshold is specified to be lower than the first threshold which allows certifying that the light emitter is only reactivated when the error or malfunction is with a high probability no longer present. The error or malfunction may be a hardware error or a software/firmware error, for example when the transmitter falls during normal operation into a test mode or other malfunctions of hardware software/firmware.

It is further to be noted that in other embodiments, the re-activating of the light emitter may only take place when the error has been investigated with testing software or other software or by a person who manually re-activates the light emitter.

Furthermore, it is to be noted that the density d of data bits may be monitored in many different ways. For example, the density of data bits may be determined by counting the number of data bits with logical level 1 contained within predetermined fixed time intervals. Thus, for each time interval, a value of the density is obtained. Furthermore, the density d of data bits may be monitored continuously by using a time interval sliding in time and determining the number of data bits within the time interval.

In the above description, embodiments have been shown and described herein enabling those skilled in the art in sufficient detail to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
monitoring an electrical data signal of data to be provided to a light emitter for optical transmission;
generating information related to the data based on the monitoring, the information including at least a density of data bits within the data; and
deactivating the light emitter based on the information including at least a density of data bits within the data.

2. The method according to claim 1, wherein the information related to the data is associated with statistical information of the data.

3. The method according to claim 2, wherein the density of data bits within the data includes a density of data bits with logical level one contained in the data.

4. The method according to claim 3, further comprising:
determining whether the density of data bits with logical level one is exceeding a predetermined first threshold;
deactivating the light emitter when the density of data bits with logical level one is exceeding the predetermined first threshold.

5. The method according to claim 4, further comprising:
activating the light emitter when the density of logical ones drops below a predetermined second threshold, the second threshold being lower than the first threshold.

6. The method according to claim 1, wherein the light emitter is deactivated dependent on only the information related to the data to be transmitted.

7. A light emitter control device comprising:
a data monitor circuit to monitor an electrical data signal of data to be provided to a light emitter for optical transmission of the data and to generate information related to the data, the information including at least a density of data bits within the data;
an analyzing circuit coupled to the data monitor circuit to analyze the information related to the data and to generate a light emitter deactivating signal based on the information including at least a density of data bits within the data.

8. The light emitter control device according to claim 7, wherein the information related to the data is associated with statistical information of the data.

9. The light emitter control device according to claim 8, wherein the density of data bits within the data includes a density of data bits with logical level one contained in the data.

10. The light emitter control device according to claim 9, wherein the analyzing circuit is adapted to determine whether the density of data bits with logical level one is exceeding a predetermined first threshold and to generate the light emitter deactivating signal when the density of data bits with logical level one is exceeding the predetermined first threshold.

11. The light emitter control device according to claim 10, wherein the analyzing circuit is adapted to generate a light emitter activating signal if the density of logical ones is dropping below a predetermined second threshold, the second threshold being lower than the first threshold.

12. The light emitter control device according to claim 8 wherein the analyzing circuit is adapted to determine the statistical information based on data of the electrical data signal provided to the light emitter during a predetermined time interval.

13. The light emitter control device according to claim 8, wherein the analyzing circuit is adapted to determine the statistical information continuously based on data of the electrical data signal provided to the light emitter during a predetermined time interval.

14. The light emitter control device according to claim 7, wherein the light emitter deactivating signal is generated only dependent on the information related to the data to be transmitted.

15. A device comprising:
a data processing circuitry, the data processing circuitry comprising a data output to output an electrical data signal;
a light emitter coupled to the data output to receive the electrical data signal and to provide an optical data transmission signal based on the electrical data signal; and
an apparatus coupled to the electrical processing circuitry to monitor the electrical data signal and coupled to the light emitter to deactivate the light emitter based on at least a density of data bits within the electrical data signal.

16. The device according to claim 15, wherein information identifying the density of data bits is associated with statistical information.

17. The device according to claim 15, wherein the apparatus is adapted to deactivate the light emitter when the density of data bits with logical level one is exceeding a predetermined first threshold.

18. The device according to claim 17, wherein the apparatus is adapted to activate the light emitter if the density of data bits with logical level one is dropping below a predetermined second threshold, the second threshold being lower than the first threshold.

19. The device according to claim 16, wherein the apparatus is adapted to deactivate the light emitter based on information related to the density of data bits within the electrical data signal provided to the light emitter during a predetermined time interval.

* * * * *